United States Patent Office 3,608,265
Patented Sept. 28, 1971

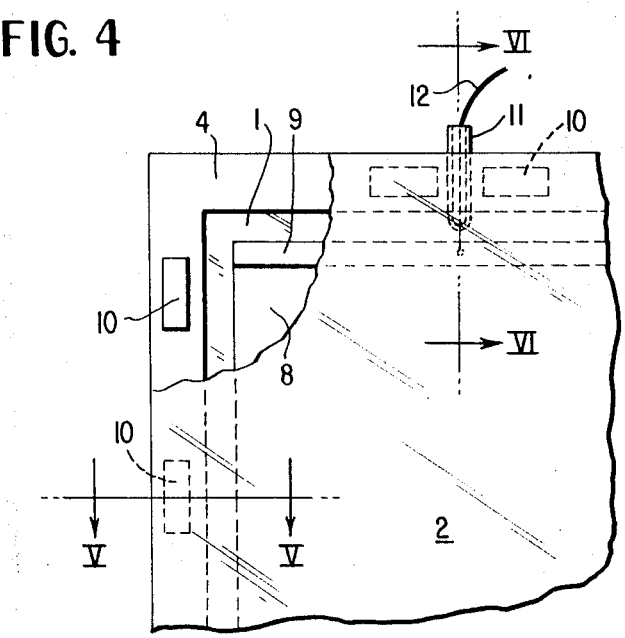
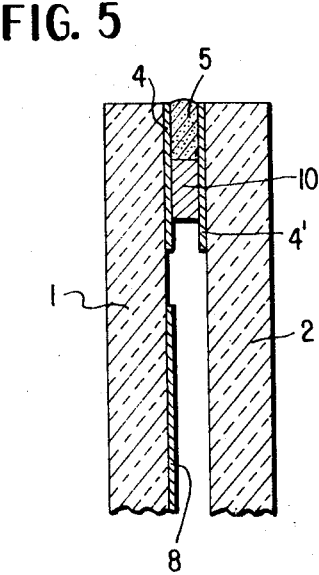
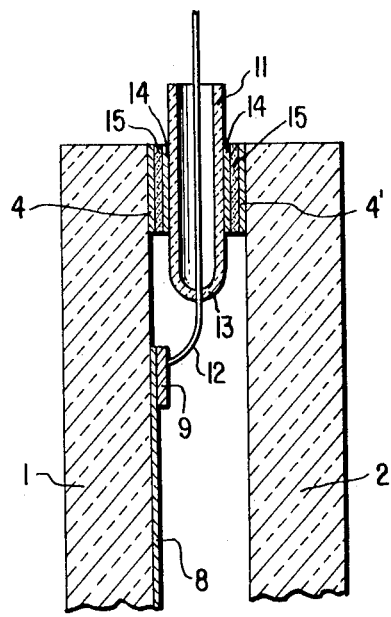

3,608,265
GLAZING UNIT AND METHOD OF MAKING SAME
Gérard Meunier, Jumet, Belgium, assignor to Glaverbel, S.A., Watermael-Boitsfort, Belgium
Filed Jan. 11, 1965, Ser. No. 424,580
Claims priority, application Luxembourg, Mar. 11, 1964, 45,630
Int. Cl. E06b 3/66
U.S. Cl. 52—616
13 Claims

ABSTRACT OF THE DISCLOSURE

The present invention relates to a novel glazing unit and to a method of manufacture thereof, and is particularly concerned with a glazing unit of the type in which two glass sheets are assembled in parallel spaced relation to form the unit.

Glazing units of the nature referred to are known, and are generally provided for the purpose of reducing to a minimum the transfer of heat through the glazing unit.

---

The present invention is concerned with a glazing unit constructed for the purpose of minimizing heat transfer therethrough and also a unit in which the optical or electrical properties can be controlled.

The modification of the optical properties consist in changing the reflecting or radiation transmitting properties of the glazing unit, especially within the range of visible and heat conveying radiations.

With respect to the electrical properties of the glazing unit, this modification consists of making the glazing unit current conductive whereby it can be heated for eliminating vapor and frost which might otherwise deposit on the surface of the glazing unit.

For these purposes, it is known to apply a thin film of suitable material such as metal oxide. When a film of this nature is applied to a pane of glass where the surface is exposed, the film is likely to be damaged because it has low strength or it does not have extremely good adherence to the glass surface or it can have an electrical potential applied thereto.

It is known to protect a layer of this nature by forming a double glazing unit in such a way that the layer covers the internal surface of one of the sheets. This solution is expensive and it is difficult to make the space between the glass sheets completely tight against moisture and foreign matter unless a marginal sealing member made of plastics or other materials is also inserted therebetween. Moreover, the aggregate thickness of such a unit is rather important and requires special window frames for its placing.

It is also known to protect a layer of this nature by covering it with another sheet of glass which is made to adhere to the former by the application of a transparent adhesive film, but this also represents additional expense.

With the foregoing in mind, a primary object of the present invention is the provision of an improved glazing unit in which the foregoing drawbacks are eliminated.

More particularly, it is an object of this invention to arrange two glass sheets in parallel spaced relation and to join the glass sheets by metal between the edges thereof which adheres to the glass.

Still another object of this invention is the provision of a glazing unit consisting of parallel spaced glass sheets, the opposite faces of which, at least at their edges, are provided with a metal film adherent to the glass and to which metal film material can be applied to join the two sheets together to form the unit.

A glazing unit of the nature referred to is relatively thin and is comparatively inexpensive to manufacture, while the strength of the unit is quite high because of the strong bond between the glass sheets along their edges and, furthermore, the unit is relatively simple to construct.

Among the materials which will readily adhere to glass are metal alloys selected from among the copper alloys. These materials are relatively inexpensive and a tin solder selected from a class of tin base alloys will readily weld to the copper alloy film at relatively low temperature so that the unit can be strongly assembled without being subjected to damaging thermal stresses during manufacture.

It is proposed further to put spacer elements between the metallic film covering the edges, for example lead plates or discs. This simplifies the manufacture of the unit and prevents the disagreeable results of accidental contacts, specially with sheets of substantial size liable to a certain warping or buckling while being handled.

The glass sheets, according to this invention, can be so disposed that a tin solder introduced along the edges of the assembled glass sheets will bind over a wide area along the edge of the unit so that an extremely strong bonding together of the glass sheets is had. Where the spacing elements between the glass sheets is of lead, the tin base solder will adhere quite well thereto.

In one modification, a tube leads into the space between the panes of glass and an electric wire is sealingly lead through the tube. Where one or more of the glass panes has a current conducting layer on the inside, this wire can be connected thereto and the glazing unit be thereby heated.

In assembling glass sheets to form the unit it is advantageous, following the metallizing of the edges of the glass sheets, to tin at least one of the metallized edges by the application of a layer of tin base solder which makes it simpler to effect good bonding of the glass sheets to each other when finally soldered together. When a metal film is tinned in this manner, the spacing plates or discs referred to previously can, at that time, be fixed to the metallized edge of one or both of the glass sheets thereby further simplifying the manufacturing.

The nature of the present invention will be more clearly understood upon reference to the following detailed specification taken in connection with the accompanying drawings in which:

FIG. 4 is a fragmentary elevational view partly broken away, showing a modification; and, FIGS. 5 and 6 are sectional views drawn at differing enlarged scales and are indicated by lines V—V and VI—VI, respectively, on FIG. 4.

Figure 1:
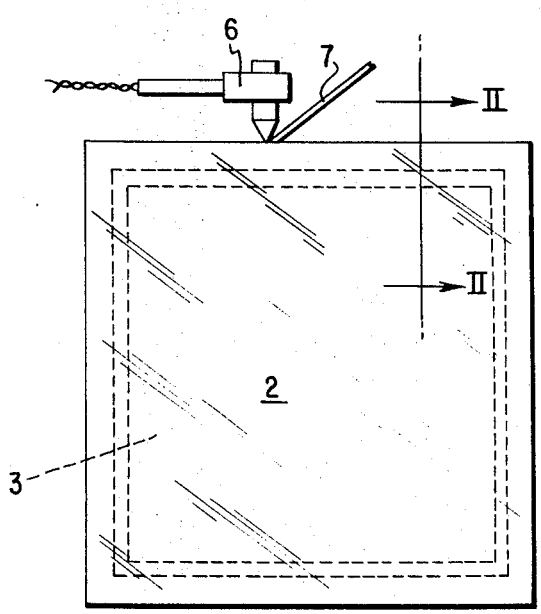
FIG. 1 is an elevational view of a glazing unit according to the present invention, being assembled.
Figure 2:
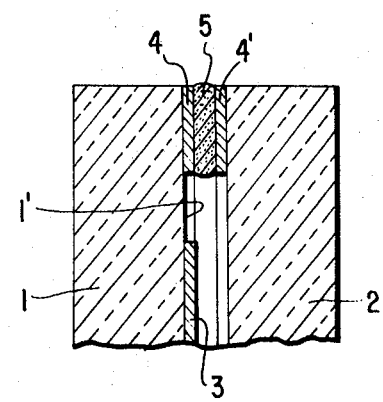
FIG. 2 is an enlarged fragmentary section view indicated by line II—II on FIG. 1.
Figure 3:
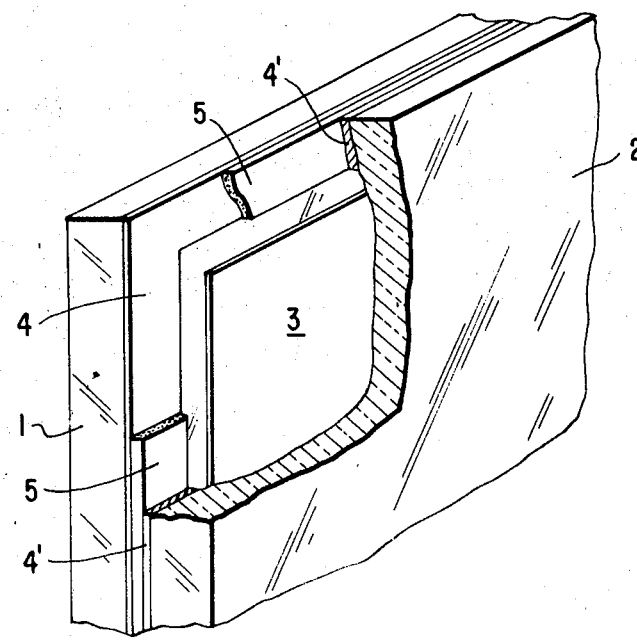
FIG. 3 is a perspective view partly broken away, showing the glazing unit of FIG. 1 and drawn at enlarged scale.

The window-pane, shown on FIGS. 1, 2 and 3, is essentially composed of two glass sheets, numbered 1 and 2 and of which the second one has been partially broken away in FIG. 3, for better showing the elements, of which said window-pane is composed.

Glass sheet 1 is covered with a thin silver layer 3 for reducing the light transmission through the windowpane. The silver layer 3 extends over the whole area of face 1' with the exception of the marginal strips. On the edge of glass sheets 1 and 2, thin films 4, 4', made of copper or of a copper alloy, are deposited on the glass. These films are welded one to the other by means of a tin solder layer 5, which strongly adheres to films 4 and 4', so that glass sheets 1 and 2 are firmly united. A window-pane, manufactured this way, efficiently protects the thin silver layer 3 of which the adherence to the glass is rather poor. The thickness of the layers and the films, described in this invention has ben intentionally magnified for the reader to get a clearer insight into the corresponding drawing.

Such a window-pane is made by first depositing on a glass sheet 1, a silver layer 3, this being made by applying one of the well known processes to this purpose. Films 4 and 4' are then made to adhere to the edges of glass sheets 1 and 2. Although several processes may be applied to this purpose, this result can be preferably achieved by melting and atomizing copper by means of a flame, whereas the tiny copper drops are projected on the edges of the glass sheets. So it is possible to get the metal, well adhering to the underlying material. At least one of the films 4 or 4' are then covered with a layer 5 of molten tin solder, which solidifies and adheres to copper. Glass sheets 1 and 2 are now placed in such a way that films 4 and 4' are facing each other and come into contact by means of tin solder layer 5. Finally, a heated element such as soldering iron 6 is passed over the edge of glass sheets 1 and 2, and also between these glass sheets, as schematically shown on FIG. 1. Layer 5 is made to melt by the heat, released by soldering iron 6. As the case may be, this layer may be fed with soldering material by making a soldering rod 7 melt. After putting said soldering iron 6 aside, layer 5 solidifies and strongly adheres to the copper, of which films 4 and 4' are made.

FIGS. 4, 5 and 6 show another example of how a window-pane, capable of releasing heat, is manufactured. Glass sheet 1 bears on one of its surfaces a thin copper layer 8, covered on two of its edges with a silver strip 9, which may be considered as rather thick. Heat is released by layer 8, in which electric power is dissipated, which electric power is uniformly distributed by strips 9, of which the electric conductibility is very high.

Small metal plates 10, made of lead in the present example, are placed between glass sheets 1 and 2. These plates are placed between copper films 4 and 4' and fixed by means of a tin solder layer 5. On the other hand a thin glass tube 11, run through by a current-conducting wire 12, welded to strip 9 is placed near this strip. One of the ends 13 of this tube is closed and sealed on wire 12 so that the enclosed internal space of the window-pane is perfectly tight. The outer surface of tube 11 is covered with a copper film 14, which is in its turn covered with a tin solder layer 15. This layer is used for fixing tube 11 to glass sheets 1 and 2 by means of copper films 4, 4' and 14, which strongly adhere to the glass.

This window-pane is assembled by a method similar to the one which has just been described. After glass sheet 1 has been covered with a thin copper layer 8, as well as with silver strips 9 and copper film 4, small plates 10 made of lead and tubes 11, previously provided with a current-conducting wire 12 and covered with copper film 14 and tin solder layer 15 are put in place.

Wires 12 are then soldered to strips 9. Finally, a second glass sheet, provided with a copper film 4' on its edge, is put in place and the window-pane is assembled by making a tin solder rod 7 melt by means of a soldering iron 6 as it has been described in the preceding example. Films 4 and 4' may also be covered with a tin soldering layer, before assembling the wondow-pane. It may be, that this is not necessary but the sealing of the window-pane is of a better quality.

Window-panes can be made by using more than two glass sheets, soldered two by two at their edges. In this case, it is recommended to deposit a copper film on the marginal part of both faces of the intermediate sheets.

It will be understood that this invention is susceptible to modification in order to adapt it to different usages and conditions; and accordingly, it is desired to comprehend such modifications within this invention as may fall within the scope of the appended claims.

What is claimed is:

1. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit.

2. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, the said metal film comprising a metal alloy.

3. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, said metal film comprising a copper alloy.

4. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, said film comprising a metal alloy and said solder comprising a tin base alloy.

5. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, said glazing unit also comprising relatively small metal spacer plates disposed parallel to and between adjacent sheets of glass in the regions thereof bearing the metal film and holding said sheets of glass in spaced parallel relation.

6. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, said glazing unit also comprising relatively small spaced apart metal spacer plates disposed parallel to and between adjacent sheets of glass in the regions thereof bearing the metal film and holding said sheets of glass in spaced parallel relation, said metal plates comprising a lead bearing material to which the said solder will adhere.

7. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, said glazing unit including at least one tube made of insulating material sealingly mounted between adjacent sheets of glass and extending through the solder layer, and a current conducting wire extending sealingly through said tube.

8. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, said glazing unit including at least one tube made of insulating material sealingly mounted between adjacent sheets of glass and extending through the solder layer, and a current conducting wire extending sealingly through said tube, said tube including a metal film on its outer surface so that the said solder will bond thereto.

9. A glazing unit comprising; at least two sheets of glass in parallel spaced relation, a metal film on at least the marginal portions of said glass sheets which faces an adjacent glass sheet, and a solder layer between adjacent metal films adherent thereto and thereby joining said glass sheets into a single unit, said glazing unit including at least one tube made of insulating material sealingly mounted between adjacent sheets of glass and extending through the solder layer, and a current conducting wire extending sealingly through said tube, at least one of said sheets of glass having a thin film of metal alloy deposited thereon extending over the central region of the said pane of glass on the side which faces an adjacent pane of glass, said film terminating inwardly from the said film applied to the margin of said pane of glass, and said wire being electrically connected to said film.

10. A method of making a glazing unit comprising at least two spaced parallel panes of glass which comprises; metalizing the marginal portions of said panes of glass on at least the sides thereof facing an adjacent pane of glass, placing the panes of glass in spaced parallel relation, and filling the space between the said metalized marginal portions with a solder which adheres to the said marginal portions.

11. A method according to claim 10, in which a solder layer is applied to at least one of the metalized marginal portions of at least one of said panes of glass prior to assembling the panes of glass.

12. A method according to claim 10, in which small metal plates are soldered to at least one of said metalized marginal edge portions of one of said panes of glass prior to assembling said panes of glass.

13. The method according to claim 10, which includes the step of providing at least one of said panes of glass on the sides thereof facing an adjacent pane of glass and inwardly from the metalized marginal portion of the said one side of said pane of glass with a thin adherent electrically conductive film of a material selected from the class of metals or metal compounds, and effecting electrical connection with said conductive film for the purpose of passing an electric current through the conductive film for heating the glazing unit.

References Cited

UNITED STATES PATENTS

| | | | |
|---|---|---|---|
| 2,198,578 | 4/1940 | Hazelton et al. | 161—45 |
| 2,235,680 | 3/1941 | Haven et al. | 161—45 |
| 2,235,681 | 3/1941 | Haven et al. | 161—45 |
| 2,378,031 | 6/1945 | Paddock | 52—616X |
| 2,513,993 | 7/1950 | Burton | 219—522X |
| 2,625,640 | 1/1953 | Gaiser et al. | 219—522 |

FOREIGN PATENTS

| | | | |
|---|---|---|---|
| 1,026,712 | 4/1953 | France | 52—616 |

KENNETH DOWNEY, Primary Examiner

U.S. Cl. X.R.

219—203